M. DIRIWACHTER.
MUSICAL GAME.
APPLICATION FILED DEC. 26, 1917.
1,283,695.  Patented Nov. 5, 1918.

UNITED STATES PATENT OFFICE.

MARGUERITE DIRIWACHTER, OF NEW YORK, N. Y.

MUSICAL GAME.

1,283,695.  Specification of Letters Patent.  Patented Nov. 5, 1918.

Application filed December 26, 1917. Serial No. 208,785.

*To all whom it may concern:*

Be it known that I, MARGUERITE DIRIWACHTER, a citizen of France, residing at New York, in the county of New York and State of New York, have invented certain new and useful Improvements in Musical Games, of which the following is a specification.

My invention relates to educational games and is intended for causing children to learn the basic facts about music, such as the appearance of the various notes and keys, in a pleasant and agreeable manner.

One of the chief difficulties of teaching music to beginners, especially to children, is to induce interest in the formal or technical part of music. The average child usually feels some interest in the actual playing itself, as this is directly connected with the agreeable effect produced by the music. It is, however, difficult to cause a child's mind to center upon, and master, the more dry, formal portion of musical education, and it is for this purpose that my new game is particularly intended.

Other objects of my invention will be set forth in the following description and drawings, which illustrate a preferred embodiment of my invention.

Figure 1 is a view of a large card, which forms one of a set or pack comprising the game, and which is hereinafter called a "pack card."

Figs. 2 and 3 illustrate other pack cards.

Figs. 4, 6 and 8 illustrate smaller cards intended to be placed upon the pack cards in the progress of the game, and which are hereinafter called "space cards."

Figs. 5, 7 and 9 are back views of Figs. 4, 6 and 8, respectively.

The pack or set of cards comprises a series of cards according to Figs. 1, 2 and 3.

Each one of these cards illustrates a succession of notes having the same time value, in the same key.

For instance, Figs. 1 and 2 illustrate eighth notes and quarter notes, respectively, and Fig. 3 illustrates whole notes.

If desired, the key can be indicated at the left of each card by a suitable symbol, and the character of the note can also be written under the staff lines, as well as any equivalent or translation thereof in some foreign language, such as the French language.

Each pack card is divided into a series of vertical columns, one note being located in each column. At the bottom of each column, and under the scale lines, the letter indicating the position of each note is imprinted or otherwise indicated, as well as the position of the said note in the musical scale.

As many of these cards can be provided to a pack as are desired, so that the game can be played by any number of players.

One of the players has a small sack or other receptacle in which are contained a number of the space cards illustrated in Figs. 4–9 inclusive, there being one space card for each column or note on the pack cards. Each space card has indicated thereon all the indicia appertaining to one of the notes on a pack card, such as the key, the position and the time value of the note. As shown in the drawings, the letter indicating the position of each note is omitted in the space cards, and, if desired, any of the indicia can be omitted, so as to cause the player to recognize the note by the musical notation alone.

On the back of each space card the time value of the note is indicated, as shown in Figs. 5, 7 and 9.

One of the players thrusts a hand into the receptacle or bag containing the space cards, and, without looking into the receptacle or bag, pulls one of them out and calls out the characteristics of the note, such as the key, the position of the scale, and time value, as indicated upon the face of the card. If this player is not sufficiently proficient to determine this from the musical notation of the note on the face of the card, then the music data may be imprinted or otherwise affixed to the rear of the card, as shown in Figs. 5, 7 and 9. The players look through their pack of cards, and the one having the column or note on the card corresponding to the space card in the hands of the first mentioned player, calls out for it and puts it into the proper column on his pack card. The game is continued until one of the players fills up a certain number of his cards, which wins the game.

In this manner the interest of the game causes the players to soon learn all the elements of musical notation, so that they can determine them at a glance, and thus read music.

While I have described a preferred embodiment of my invention, it is clear that changes can be made therein without departing from its spirit, as I do not wish to be limited to the details above described.

I claim:

1. An educational game comprising a number of pack cards having a staff and a plurality of notes indicated thereon, said notes being spaced from each other, and the said cards having a space below the lowest of said notes, and a plurality of space cards, each space card having a staff and a single note on said staff imprinted thereon, each note on a space card being identical with a note on one of said pack cards, each said space card being sufficiently small to be placed adjacent its corresponding note on a pack card, so that the said space cards can be arranged on the said pack cards in an order corresponding to the order of their corresponding notes.

2. An educational game comprising a number of pack cards having a staff and a plurality of notes indicated thereon, said notes being spaced from each other, and the said cards having a space below the lowest of said notes, and a plurality of space cards, each space card having a staff and a single note on said staff imprinted thereon, each note on a space card being identical with a note on one of said pack cards, each said space card being sufficiently small to be placed adjacent its corresponding note on a pack card, so that the said space cards can be arranged on the said pack cards in an order corresponding to the order of their corresponding notes, the said space cards having data appertaining to their respective notes imprinted thereon.

3. An educational game comprising a plurality of pack cards, each pack card having a staff and a plurality of notes and a symbol indicative of a particular key imprinted thereon, the said notes being spaced from each other, vertical lines dividing the said pack cards into columns, each note having its own colmun, and each said pack card having a portion thereof extending below the lowest note imprinted thereon, so that the said vertical lines mark out a series of boxes directly underneath the said notes, and a plurality of space cards, each space card having a staff, a designation of a key, and a note imprinted thereon, the note of each space card being identical with a note on a pack card, the said space cards being sufficiently small to fit within the before mentioned boxes.

4. An educational game comprising a plurality of pack cards, each pack card having a staff and a plurality of notes and a symbol indicative of a particular key imprinted thereon, the said notes being spaced from each other, vertical lines dividing the said pack cards into columns, each note having its own column, and each said pack card having a portion thereof extending below the lowest note imprinted thereon, so that the said vertical lines mark out a series of boxes directly underneath the said notes, and a plurality of space cards, each space card having a staff, a designation of a key, and a note imprinted thereon, the note of each space card being identical with a note on a pack card, the said space cards being sufficiently small to fit within the before mentioned boxes, the said boxes and the said space cards having indicia appertaining to their respective notes imprinted thereon.

5. An educational game comprising a series of pack cards having a staff, a plurality of notes, and a designation of a key imprinted thereon, the said notes being spaced from each other, and each said pack card having a portion extending below the lowest of said notes, a plurality of space cards, each space card having a staff, a note and a designation of a key imprinted thereon, the note on each space card being identical with a note on a pack card, the said space cards having some notations indicative of their respective notes imprinted on the back thereof.

In testimony whereof I hereunto affix my signature.

MARGUERITE DIRIWACHTER.